United States Patent [19]

Munk

[11] Patent Number: 4,667,465

[45] Date of Patent: May 26, 1987

[54] INTERNAL COMBUSTION ENGINE SYSTEM AND METHOD WITH REDUCED NOXIOUS EMISSIONS

[76] Inventor: Michael Munk, 28 Dorchester Dr., Rye Brook, N.Y. 10573

[21] Appl. No.: 760,358

[22] Filed: Jul. 30, 1985

[51] Int. Cl.$^4$ .............................................. F02C 9/00
[52] U.S. Cl. ..................................... 60/39.3; 60/39.53
[58] Field of Search ................... 60/39.05, 39.3, 39.5, 60/39.53, 39.55, 39.59, 728; 431/76, 190

[56] References Cited

U.S. PATENT DOCUMENTS

| | | | |
|---|---|---|---|
| 2,482,394 | 9/1949 | Wyman | 60/39.3 |
| 3,353,360 | 11/1967 | Gorzegno | 60/39.3 |
| 3,693,347 | 9/1972 | Kydd et al. | 60/39.55 |
| 4,259,837 | 4/1981 | Russell et al. | 60/39.05 |
| 4,375,950 | 3/1983 | Durley | 431/76 |

Primary Examiner—Louis J. Casaregola
Attorney, Agent, or Firm—Martin M. Novack

[57] ABSTRACT

An ultrasonic fog generator can be used to advantage in injecting a fog into the input air of a combustion chamber, in order to improve the efficiency of the combustion chamber and reduce the noxious emissions in the exhaust. In accordance with a feature of the disclosure, a sensor is provided to sense the concentration of noxious emissions in the exhaust of the combustion chamber. The volume per unit time of the injected fog is increased as the concentration of the noxious emissions increases, and controlled to a preselected emissions setpoint. In accordance with a further feature of the disclosure, a supply of chemical suitable for reacting with a component of the noxious emissions is provided, along with means for combining the chemical with the water supplied to the fogging device.

20 Claims, 8 Drawing Figures

INTERNAL COMBUSTION ENGINE SYSTEM AND METHOD WITH REDUCED NOXIOUS EMISSIONS

BACKGROUND OF THE INVENTION

This invention relates to internal combustion engine systems and, more particularly, to improvements in such systems which decrease noxious emissions, increase operating efficiency, and reduce maintenance requirements. The subject matter of this application is related to subject matter in Applicant's copending U.S. patent application Ser. No. 760,357, filed of even date herewith.

The emission of noxious gases by internal combustion engines (including Brayton turbine combustion cycle systems, diesel engines, Otto-cycle spark ignition engines, and the like) is a continuing problem. From an environmental standpoint, the noxious gases are unacceptable pollutants, and government has become heavily involved in the regulation of emission of such noxious gases. The cost to society is very substantial, as measured by the degradation of the environment plus the cost of limiting or controlling such emissions, which is ultimately paid by the consumer. It is also well known that a combustion process which results in a high level of noxious emissions is generally less efficient, from the standpoint of energy output, than the same process operating in a manner which results in a lower level of noxious emissions.

It has long been recognized in the art that controlled injection of water into a combustion engine can, under certain conditions, increase the operating efficiency and reduce the noxious emissions in the exhaust. One drawback of prior art water injection has been the almost immediate corrosion which can occur when water is introduced (either intentionally or during an injection malfunction) directly to hot engine components.

The products of combustion are rich in oxides of nitrogen ($NO_x$) formed when unburned oxygen combines with nitrogen, the inert component of ambient air at elevated temperatures. $NO_x$ is an environmental hazard. Excess air is technically defined as that quantity in excess of the theoretical quantity required for complete combustion of a fuel. The combustion turbine, to which the present invention has particular although not exclusive application, operates at very high excess air rates. The high excess air rates produce high levels of noxious and toxic $NO_x$. Fuel-bound nitrogen and sulfur also cause problems.

It is know that $NO_x$ and other noxious emissions can be reduced by water injection in the combustion chamber, which reduces flame temperatures. Unfortunately, heat needed to vaporize the injected water is wasted energy. Also, to preclude scaling, costly ultra-pure water is needed. Externally produced steam has also been used as an injection medium to reduce $NO_x$, but this requires substantial additional energy and adds additional environmental hazards due to volatile anti-corrosive chemicals found in high pressure steam.

In the U.S. Pat. No. 4,313,300, the quantity of $NO_x$ emissions generated by a combined gas turbine-steam boiler power plant is controlled by recycling steam boiler exhaust gas to the air compressor of the gas turbine, thereby increasing the combustor inlet humidity.

In the U.S. Pat. No. 4,231,333 fuel or water injection into an internal combustion engine is controlled based upon detection of predetermined engine conditions, such as pressure within the engine intake manifold.

In the U.S. Pat. No. 4,417,547 atomized fluid from a nozzle is injected into the carburetor of an internal combustion engine, the rate of fluid injection being varied in response to variations in engine speed and engine load.

It is among the objects of the present invention to provide internal combustion engine systems which improve over the described types of systems, and which decrease noxious emissions, increase operating efficiency, and reduce maintenance requirements.

SUMMARY OF THE INVENTION

Applicant has discovered that an ultrasonic fog generator can be used to advantage in injecting a fog into the air received by a combustion chamber, in order to improve the efficiency of the combustion chamber and/or reduce the noxious emissions in the exhaust of the combustion chamber.

A form of the invention is applicable to a turbine power generator which includes a source of input air, a source of fuel, a compressor which receives the input air, a combustion chamber which receives air from the output of the compressor and fuel from the source of fuel, a turbine which receives exhaust gases from the combustion chamber, and an electrical generator mechanically coupled with the turbine. In accordance with the improvement of this embodiment of the invention, a fogging device is provided and communicates with the input air, the fogging device being adapted to receive a fogger air supply and a fogger water supply, and to generate a fog in the source of input air. The fogging device preferably operates to achieve evaporation to dryness prior to entry into the combustion chamber; the vapor phase of the water being much less harmful than the liquid. Means are provided for sensing noxious emissions in the exhaust gases. Means are then provided for controlling the fogging device in accordance with the sensed noxious emissions. In the preferred embodiment of the invention, the sensing means is operative to sense the concentration of the noxious emissions, and the controlling means controls the fogging device to increase the water volume per unit time of the fog as the concentration of the noxious emissions increases.

In a form of the invention, the means for sensing noxious emissions in the exhaust gases includes a sensor adapted to be disposed in the exhaust gases for sensing the concentration of a noxious emission such as $NO_x$ and generating an electrical signal which depends upon said concentration. In this embodiment, the means for controlling the fogging device includes a processor responsive to the electrical signal for generating a control signal, and a pneumatic control system responsive to the control signal for controlling the supply of compressed air and the supply of water to the fogging device. The fog can be controlled by a humidity and dew-point sensor, to assure only a vapor phase at entry to the combustion chamber. The present invention also has application to other types of systems having a combustion chamber, including diesel engines, auto-cycle spark ignition engines, and the like.

Among the advantages of the present invention are the following:

The formation of $NO_x$ is endothermic and removes available energy. Accordingly, by reducing $NO_x$ formation, a substantial increase in efficiency is obtained.

Excess air is diminished as fog vapor displaces excess air at the input to the combustion chamber. Less excess air results in less $NO_x$ formation.

When a fog, which has droplets of about 10 microns or less size, is produced, minerals dissolved therein are evaporated to dryness and travel, with little deleterious effect, through engine components as sub-micron dust particles. This reduces the need for expensive ultrapure water, often used for engine water injection in industry.

The use of an ultrasonic fogger is advantageous in providing a uniform humidity in the air which enters the combustion chamber, which overcomes uniformity problems associated with some water injection techniques.

By modifying the fog water content as a function of the measured noxious emissions, the fog can be precisely tailored to minimize noxious emissions.

In accordance with a further feature of the invention, a supply of chemical suitable for reacting with a component of the noxious emissions (for example calcium carbonate or bicarbonate or calcium oxide to react with sulfur in noxious sulfur dioxide) is provided, along with means for combining the chemical with the water supplied to the fogging device.

Further features and advantages of the invention will become more readily apparent from the following detailed description and taken in conjunction with the accompanying drawings.

DESCRIPTION OF THE PREFERRED EMBODIMENT

Figure 1:
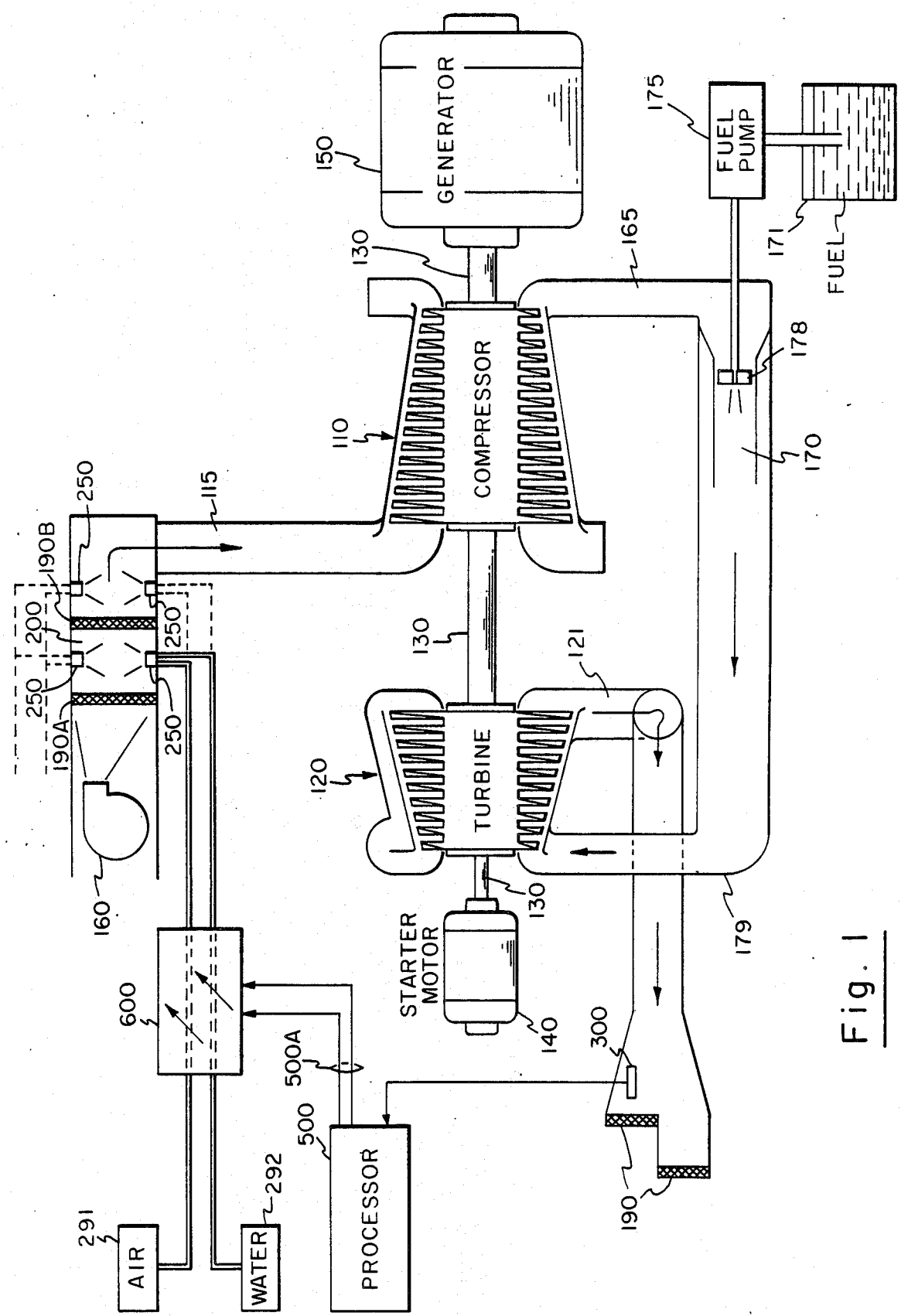
FIG. 1 is a block diagram, partially in schematic form, of an apparatus in accordance with an embodiment of the invention, and which can be used to practice a form of the method of the invention.

Referring to FIG. 1, there is shown an apparatus in accordance with an embodiment of the invention, and which can be used to practice a form of the method of the invention. A combustion turbine power generating system is shown, and conventionally includes a compressor 110 and a turbine 120 which are mounted on a common shaft 130 that is coupled, in the present embodiment, to a starting motor 140 and an electrical generator 150. A blower 160 provides a forced draft of air through a chamber which includes a fogging subsystem 200 and then through input duct 115 to the input opening of compressor 110. Compressed air is coupled from the output of compressor 110, via the duct 165, to an input of a combustion chamber 170. A source of fuel 171 is fed to the combustion chamber 170 via a fuel pump 175 and a fuel nozzle 178. The hot combustion gases from combustion chamber 170 are fed to the input of turbine 120 via the duct 79. As described further hereinbelow, the exhaust gases output from the turbine at 121 can be passed through a heat exchanger (shown at 190) which reclaims some of the heat of the exhaust gases, this heat being used for preheating of the input air, as indicated by the coils 190A and 190B.

A noxious emission sensing unit 300 is disposed in the path of the exhaust gases; i.e., it can be located in said exhaust gases from the combustion chamber 170 before or after the turbine 120. As illustrated, although not necessarily, the sensing unit 300 is located at the output port from which the exhaust gases leaving the turbine are emitted. The sensing unit 300 includes one or more sensing devices.

The fogging subsystem 200, which includes one or more fogging devices, is located in the path of the air that is input to the compressor 110. In the present embodiment four ultrasonic fogging devices 250 are shown, two positioned after the heating coil 190A and two after heating coil 190B.

As used herein, "fog" means water droplets in air that have a size of the order of 10 microns or less, are relatively unstable due to their small volume as compared to their surface area, and therefore evaporate to dryness in the air. The water droplets are propelled by the force of compressed air at velocities high enough to assure uniform mixing through cross flow injection into a receiving air stream. An embodiment of a fogging device 250 is shown in simplified form in FIG. 2.

Each fogging device of the present embodiment comprises a nozzle 251 having a cylindrical body 252 with a central bore 253. Compressed air from a source 291 is coupled to the bore 253. The compressed air may alternatively be bled from compressor 110. Water under pressure, from a source 292, is coupled through a transversely disposed conduit 254 that communicates with the bore 253. An adjustable resonator cup 255, facing the nozzle opening at the front end of bore 253, is mounted on an "L"-shaped standoff 256 that extends from body 252 and permits controlled dispersion of the fog.

In operation, as the pressurized air pulsates through the bore 253, water pulsates through the conduit 254 and mixes with the air in the bore 253. The ultrasonic standing shock wave in the bore shears the water particles into fine droplets. The resonator cup 255 reflects the high speed air against the emerging water particles or droplets in a manner that reduces the water droplets to a size of the order of 10 microns or less, and deflects these minute droplets outward for cross flow mixing with the primary air flow passing through the fogging subsystem 200. The droplets are formed in a tunable field whose shape can be selected by the variable distance between the opening and front flat reflective face of nozzle 251 and the resonator cup 255. The flow of both compressed air and water input to the fogging devices 250 is controlled by control unit 600, so as to increase or decrease the volume of generated fog at uniform fog density.

Figure 2:
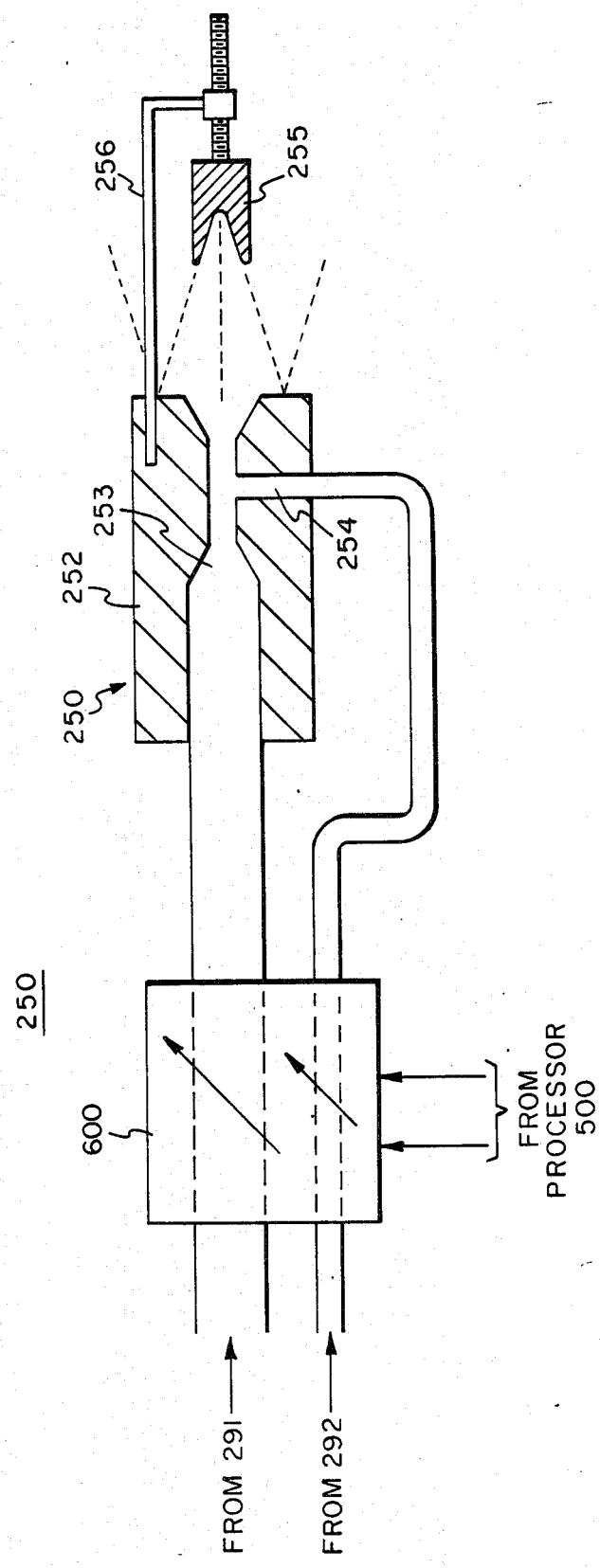
FIG. 2 is a diagram, partially in schematic cross-sectional form, of a fogging unit and associated control system, as utilized in an embodiment of the invention.

The type of fogging unit illustrated in FIG. 2 is described in further detail in the copending U.S. patent application Ser. No. 697,335 and ultrasonic foggers are also disclosed, for example, in U.S. Pat. Nos. 4,042,016 and 4,118,945. Suitable foggers are sold by Cool Fog Systems, Inc. of Rye Brook, N.Y.

In the present embodiment, the noxious emissions sensing unit 300 is of the type that employs an $NO_x$ sensing element which, as known in the art, is operative to produce an output electrical signal that is proportional to the concentration of oxides of nitrogen in the gases passing over the sensing element. The unit 300 may be of the type made by General Instrument Corp. or by Delco division of General Motors Corp. Also, it will be understood that sensors of other types of noxious emissions can be employed, such as an $SO_x$ sensor.

The output 300A of sensing unit 300 is coupled to an input of a processor 500. The processor 500 may comprise any suitable microprocessor, such as a Model Z80 processor sold by Zilog Corp. or other suitable general or special purpose digital or analog processors, having the conventional associated clock, memory, and input/output peripherals. Outputs 500A of the processor 500 are coupled to pneumatic control system 600 which, in the present embodiment, may be of the type, for example, manufactured and sold by Honeywell Corp. of Minneapolis, Minn. It will be understood, however, that alternative control means can be employed. In the present embodiment the pneumatic control system 600 is operative, in response to signals on lines 500A to control together (i.e., to increase together or decrease together, depending on control signals 500A) the compressed air supply from source 291 and the pressurized water supply from source 292 to the fogging units 250.

Figure 3:
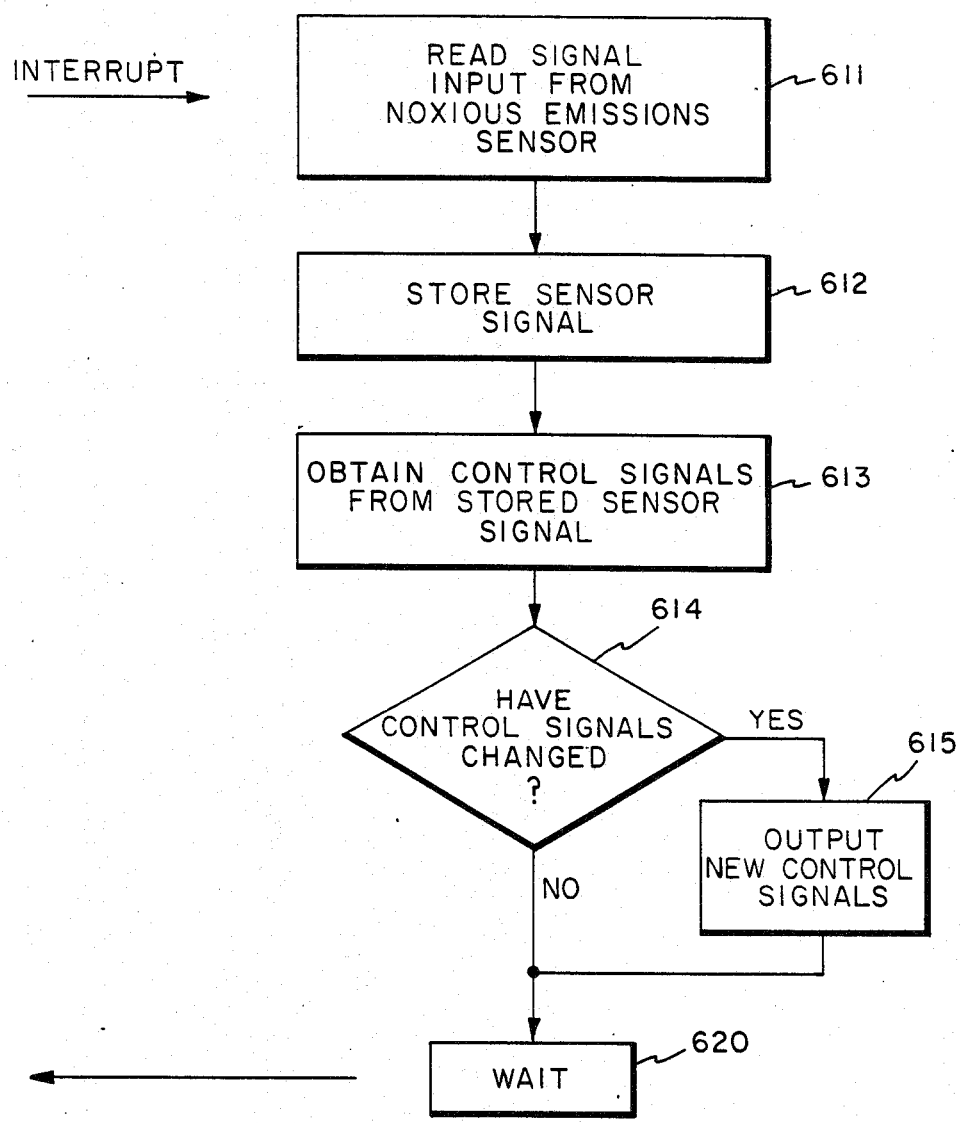
FIG. 3 is a flow diagram of a routine for the processor of the FIG. 1 embodiment.

Referring to FIG. 3, there is shown a flow diagram of a routine under which the processor 500 can be controlled to receive signals from the noxious gas sensing unit 300, and generate control signals for controlling the pneumatic control system 600. In the routine of FIG. 3, interrupt signals are generated periodically or at a rate determined by the operator. Alternatively, the interrupt signal can be derived from a handshake signal from the system 600, indicating that it is ready to receive a further control signal. In the routine of FIG. 3, upon an occurrence of an interrupt signal, the level of the voltage from the noxious gas sensing unit 300 is read and stored, as represented by the blocks 611 and 612. Control signal values are then obtained from the stored sensor signal, as represented by the block 613. [The stored sensor signals can also be permanently recorded, so as to have a permanent record of noxious emission levels.] A look-up table may be used, for example, to store control signal values as a function of sensor readings. Within threshold limits, the control signals will reflect an increase in water content of the fog as the level of noxious emissions increases, and vice versa, to move toward a set point emission level. However, it will be understood that suitable computed or empirically derived curves can be stored in processor 500 for obtainment of the control signals. A determination is then made (diamond 614) as to whether or not the computed control signals are different from the previously applied values. If not, block 620 is entered directly, and the next interrupt is awaited. If there has been a change, the new control signals are applied to pneumatic control system 600 via the lines 500A (block 615) and the block 620 is then entered to await the next interrupt.

Figure 4:
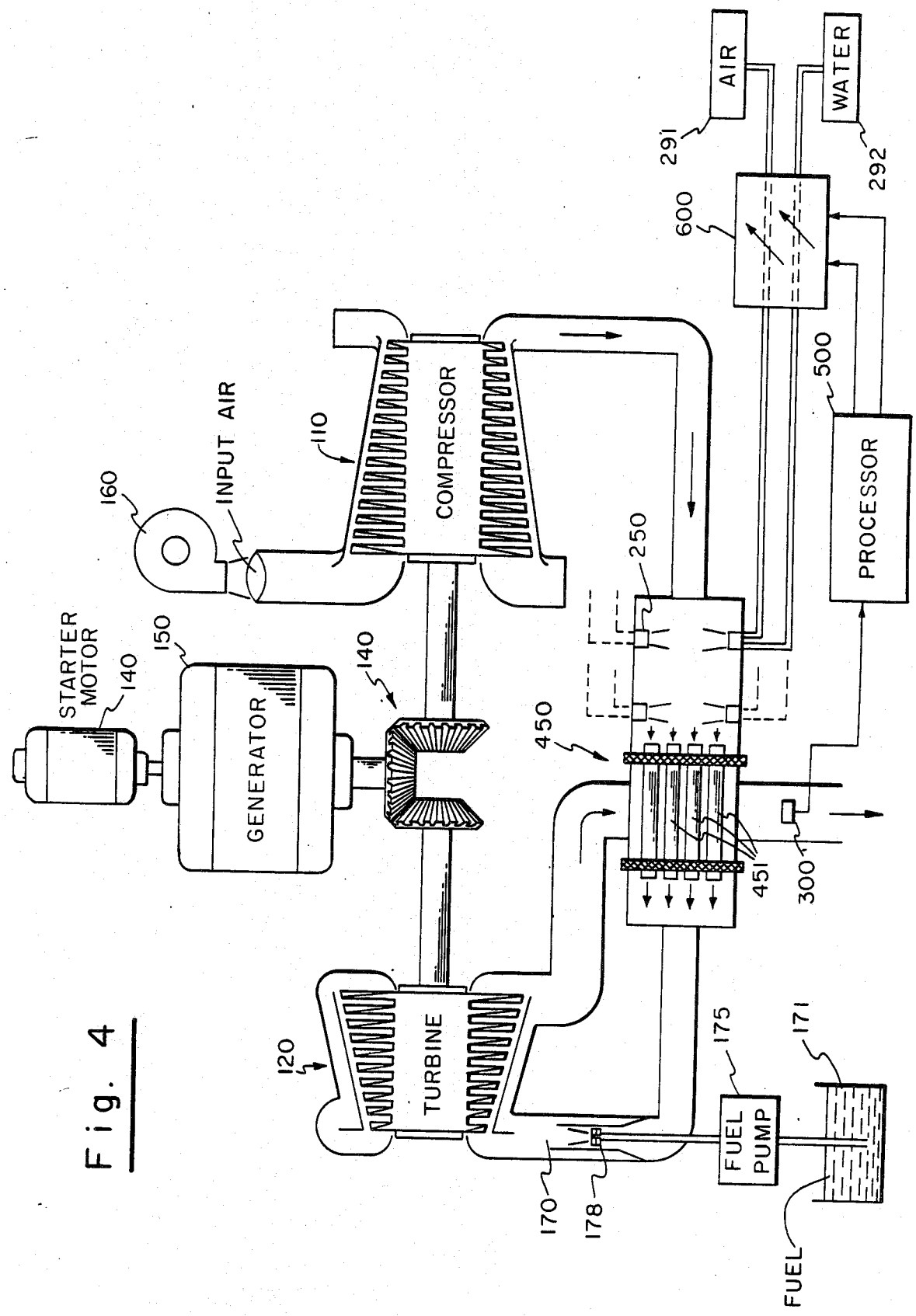
FIG. 4 is a block diagram, partially in schematic form, of an apparatus in accordance with another embodiment of the invention, and which can be used to practice a form of the method of the invention.

Referring to FIG. 4, there is shown a diagram of another embodiment of the invention in a turbine power generation system, but wherein the ultrasonic fogging unit, labelled 200', is located at the output end of the compressor 110. In this embodiment, wherein elements having like reference numerals correspond to their counterparts in the FIG. 1 diagram, the turbine 120 and the compressor 110 are coupled together via gearing 410 that is driven by the turbine 120. A portion of the gearing 410 is used to drive generator 150. In this embodiment, the compressor 110 receives ambient air, the process of compressing this air causing a rise in its temperature to, for example, 700 degrees F. [The temperatures given here and elsewhere are exemplary only, and it will be understood that they will vary from system to system, and with different operating conditions.] The compressed and heated air from compressor 110 is passed through fogging chamber 200', which includes fogging devices 250 as previously described. The humidifying of the air cools the air to a temperature, for example, of 450 degrees F. This air enters a heat exchanger 450, where it is again heated, with heat from the turbine exhaust gases, back to a temperature of, for example, about 700 degrees F. The heat exchanger of the present embodiment is of shell and tube type and includes a number of tubes 451 through which the air to be heated is passed. The tubes are connected by heat-conducting fins. The exhaust gases exiting the turbine 120 are passed over the fins and tubes to effect the heat exchange from the exhaust gases to the compressed and humidified air entering combustion chamber 170. This embodiment has some operational advantages. The compressor will operate at a higher efficiency to compress the air before humidification, and the heated compressed air is easier to humidify. The heat exchange adds heat to the air that is cooled at constant enthalpy by the humidifying process and the heat exchange is efficient due to the temperature difference between the exhaust gases (at, say, 1000 degrees F.) and the humidified compressed air.

Figure 5:
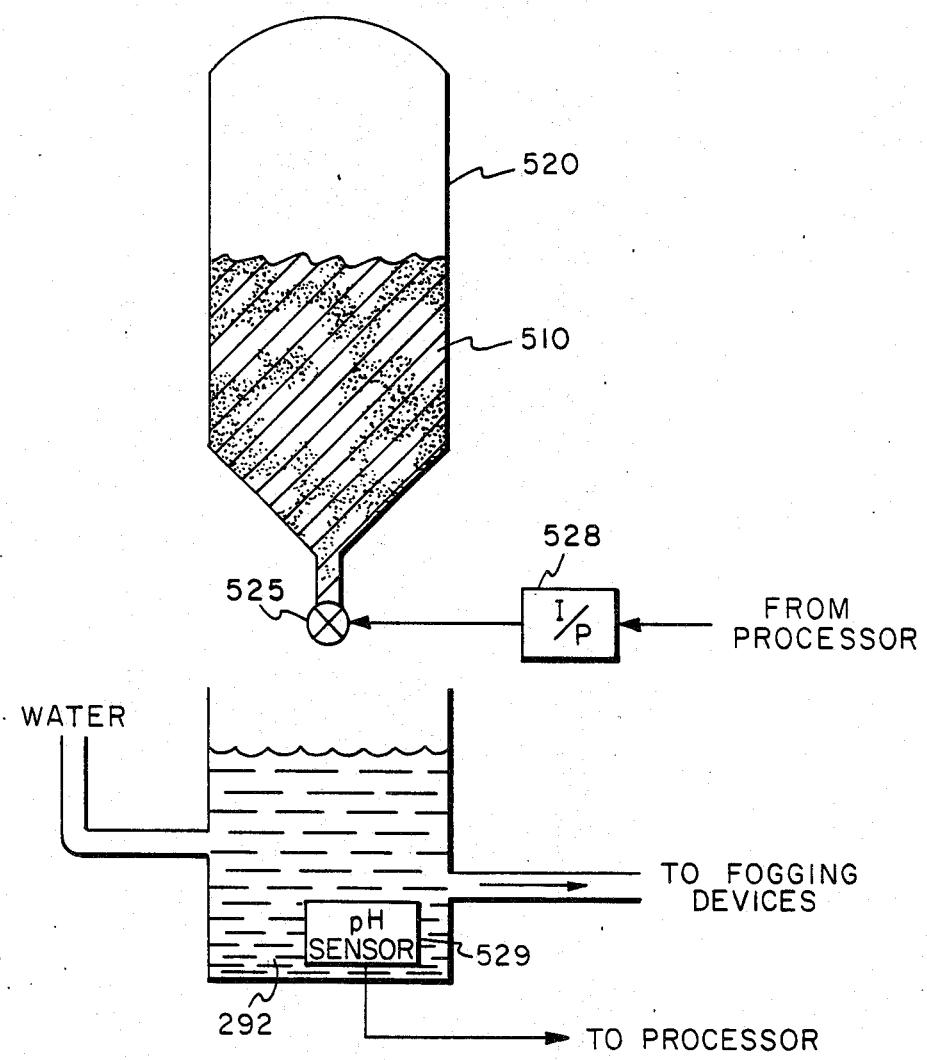
FIG. 5 shows a diagram of a further feature in accordance with the invention.

Referring to FIG. 5, there is shown a further feature which can be employed, for example, in the embodiments of FIGS. 1 or 4 to even further reduce noxious emissions, or in other forms of the invention in conjunction with other types of internal combustion engines. In accordance with the feature of FIG. 5, a source of chemical 510 is provided, and is mixed or dissolved into the water supply 292 to the fogging subsystem 200 or 200'. The chemical is selected for combination with an expected noxious gas component of the combustion exhaust. For example, to reduce sulfur dioxide, a solution of calcium hydroxide may be used. Accordingly, the chemical 510 may be a calcium-bearing compound such as calcium oxide, calcium carbonate or calcium bicarbonate. The fogging subsystem is a particularly advantageous way of uniformly and accurately introducing the chemical into the combustion chamber without special carrier means, etc. As the water is evaporated to dryness in the fogged air, the dissolved solids are introduced to the combustion chamber as tiny particles which readily react with the undesirable noxious components. In the embodiment of FIG. 5, a bulk supply of chemical 510 is provided in a silo 520 which has a pneumatically controlled rotary valve 525 that controls the flow of chemical into water supply tank 292. The water in tank 292 is supplied to the fogging devices, as represented in FIGS. 1 and 4. An I/P transducer 528 is provided and receives a control signal from the processor 500 (e.g. FIG. 1), which is converted to a pressure signal that regulates the valve 525 to determine the concentration of the solution in tank 292. A pH sensor 529 provides a signal to the processor for monitoring the solution in tank 530. It will be understood that other techniques can be provided for controlling and maintaining the concentration of the solution provided to the fogging devices. Also, other noxious components, such as $NO_x$ can be further controlled in this way, and more than one chemical can be utilized if desired.

The control of the concentration of chemical in the water supplied to the ultrasonic fogging devices is in accordance with the sensed level of noxious emissions, such as are sensed by sensing devices in the sensor unit 300 of FIG. 1 or FIG. 4. The concentration can be under direct operator control (and thereby determined from readings at one or more of the sensors) or can be under control of the processor 500 (as indicated by the line 500B) or a separate processor.

Figure 6:
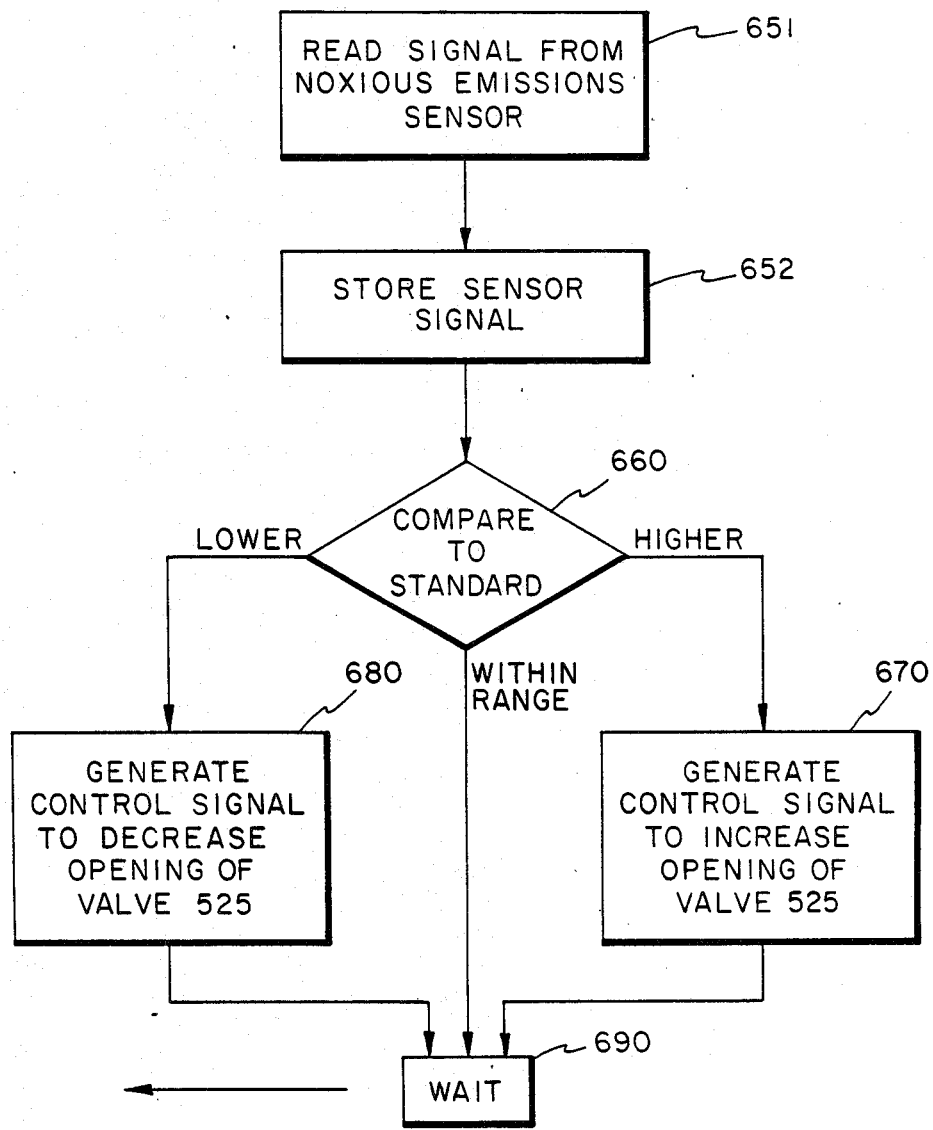
FIG. 6 is a flow diagram of a routine for controlling chemical concentration of the water supplied to the fogging devices.

Referring to FIG. 6, there is shown a flow diagram of a routine under which the processor 500 can be controlled to receive signals from the noxious gas sensing unit 300, and generate control signals for controlling the transducer 528 and the valve 525 to obtain the desired concentration of chemical in the water supplied to the fogging devices 250. In the routine of FIG. 6, interrupt signals are again generated periodically or at a rate determined by the operator, or can be derived from handshake signals. Upon occurrence of an interrupt signal, the level of the voltage from the noxious gas sensing unit 300 is read and stored, as represented by the blocks 651 and 652. [Again, the measured sensor signals can also be permanently recorded, so as to have a permanent record of noxious emission levels.] The measured value is then compared to a predetermined standard value range, as represented by the decision diamond 660. If the measured value is greater than the predetermined standard value range, the particular noxious emission being measured (e.g. sulfur dioxide) is higher than desired, and this results in the issuance of a control signal (block 670) which tends to open further the valve 525 to increase the concentration of the chemical 510 in the water supply. If the measured value is below the standard value range, the chemical concentration can be reduced. Accordingly, the block 680 represents the issuance of a control signal that tends to close valve 525. If, however, the measured value is within the predetermined standard range, the control signal to valve 525 maintains the valve setting at its present state. The block 690 is then entered to await the next interrupt.

It will be understood that the processor 500 can operate to control both the amount of fog generated, and the chemical concentration of the fog, based either on the sensed level of a single type of noxious emission (such as $NO_x$) or two or more types of noxious emissions (such as $NO_x$ and $SO_x$).

Figure 7:
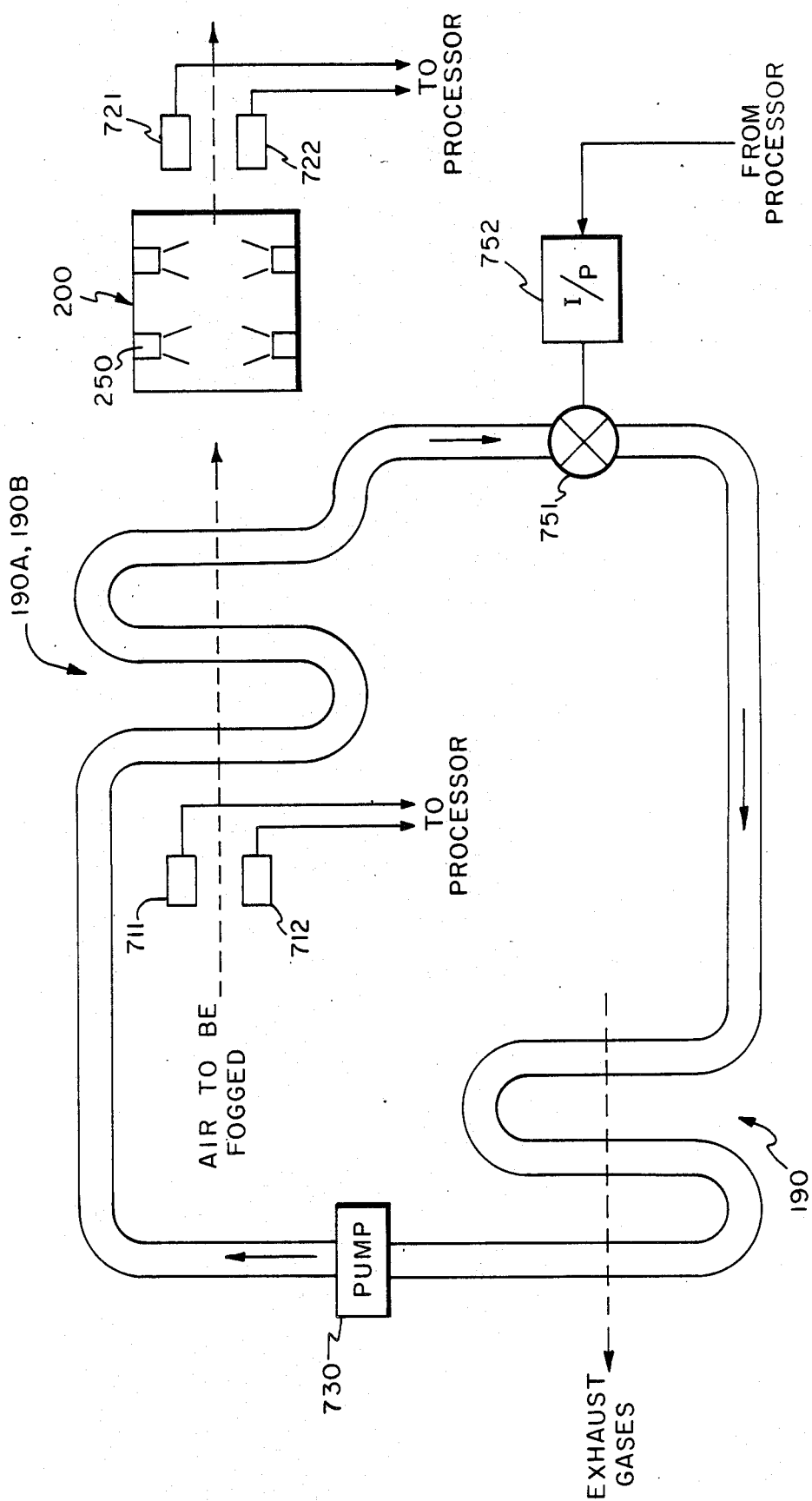
FIG. 7 is a diagram of an adjustable heat exchanger as used in a disclosed embodiment.

Referring to FIG. 7, there is shown a diagram of an adjustable heat exchanger that is utilized, for example, in the embodiment of FIG. 1, some components of which are shown again in FIG. 7. As described generally in conjunction with FIG. 1, a heat exchanger includes coil 190 located in the exhaust path, the coil 190 being coupled in a closed loop pipe with coils 190A and 190B, which heat the air to be fogged by the fogging devices 250. A pump 730 circulates the heat exchange fluid, typically water, in the closed loop system. In the FIG. 7 embodiment a temperature sensor 711 and dewpoint temperature sensor 712 are provided in the path of the input ambient air and temperature and humidity sensors 721 and 722 are also respectively provided in the path of the fogged air. The readings from these sensors are input to the processor 500. A pneumatically-controlled valve 751 regulates the flow of the heat exchange fluid around the closed loop. The valve 751 is controlled by the output of an I/P transducer 752, which operates under control of a control signal from processor 500 (e.g. FIG. 1 or FIG. 4).

In operation, the level of heat exchange is regulated, by controlling valve 751, in accordance with the amount of heat necessary to preheat the ambient air to a temperature that facilitates the humidification by the fogging devices 250. The desired level of fogging may be determined from consideration of reduction of noxious emissions (as described above) or otherwise. The temperature sensor 711 and dewpoint temperature sensor are used to determine respective properties of the input air, and heat exchange can be either manually controlled in accordance therewith, or automatically controlled such as by using a look-up table technique, to determine the level of heat exchange. It will be understood that in this and other embodiments, the humidity of the input air can be taken into account in determining the desired level of fogging by the fogging devices 250. Also, sensors 721 and 722 and/or other sensors can be used to monitor the characteristics of the humidified air.

Figure 8:
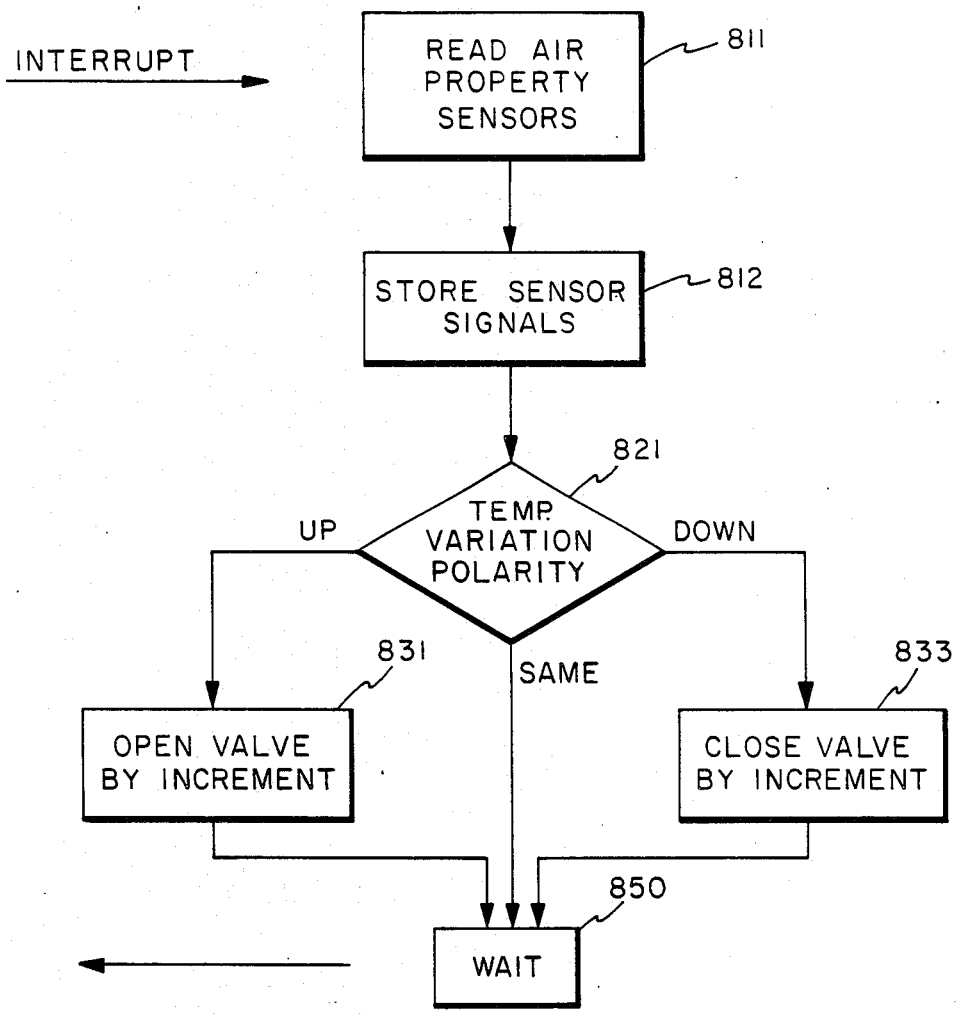
FIG. 8 is a flow diagram of a routine for controlling the adjustable heat exchanger of FIG. 7.

Referring to FIG. 8, there is shown a flow diagram of a routine under which the processor 500 can be controlled to receive signals from the sensors 711 and 712 and generate control signals for controlling the transducer 752 and the valve 751 to obtain the desired heating of the input air by control of the heat exchange process. In the routine of FIG. 8, interrupt signals are again generated periodically or at a rate determined by the operator, or can be derived from handshake signals. In the routine of FIG. 8, upon an occurrence of an interrupt signal, the sensor levels are read and stored, as represented by the blocks 811 and 812. [Once again, the measured sensor signals can also be permanently recorded, so as to have a permanent record of temperature, humidity, etc.] The measured values are then input to a look-up table, which may also receive an input representing the desired humidity of the fogged air (diamond 821). The look-up table output will be a temperature variation polarity for the input air; i.e., one which dictates an increase, decrease, or no-change in temperature of the input air. [It will be understood that the look-up table, or other means can also provide values for controlling the fogging units, as described hereinabove.] If the temperature of the input air is to be increased from its present temperature then the block 831 is entered, this block representing the issuance of a control signal which tends to open further the valve 751 (FIG. 7) to increase the level of heat exchange to the input air. If the temperature of the input air is to be decreased from its present temperature, the block 833 is entered, this block representing the issuance of a control signal which tends to close further the valve 751. If the temperature of the input air is determined to be in a presently acceptable range, the control signal to the valve 751 is maintained at its present state. In all cases the block 850 is then entered to await the next interrupt.

The invention has been described with reference to particular preferred embodiments, but variations within the spirit and scope of the invention will occur to those skilled in the art. For example, as indicated above, the invention also has application to other types of internal combustion engines. Also, other arrangements of the components of the turbine power generation system can be employed. Finally, it will be understood that the control processor can utilize various other techniques for obtaining output control signals from the sensed concentration of noxious emissions or other measured or preset conditions.

I claim:

1. An improved turbine apparatus, comprising:
   a turbine power generator, including a source of input air, and a source of fuel, a compressor which receives said input air, a combustion chamber which receives air from the output of the compressor and fuel from said source of fuel, a turbine which receives exhaust gases from said combustion chamber; and an electrical generator mechanically coupled with said turbine;
   a fogging device communicating with said input air, said fogging device being adapted to receive a fogger air supply and a fogger water supply, and to generate a fog in said input air;
   means for sensing noxious emissions in said exhaust gases; and
   means for controlling said fogging device in accordance with the sensed noxious emissions.

2. Apparatus as defined by claim 1 wherein said sensing means is operative to sense the concentration of said noxious emissions, and wherein said fogging device is controlled in accordance with said concentration.

3. Apparatus as defined by claim 2, wherein said means for controlling said fogging device is operative to increase the volume per unit time of said fog as the concentration of noxious emissions increases.

4. Apparatus as defined by claim 1, wherein said means for controlling said fogging device is operative to control both the supply of water and the supply of compressed air to said fogging device.

5. Apparatus as defined by claim 3, wherein said means for controlling said fogging device is operative to control both the supply of water and the supply of compressed air to said fogging device.

6. Apparatus as defined by claim 1, wherein said means for sensing the concentration of noxious emissions includes means for sensing the concentration of $NO_x$ in said exhaust gases.

7. Apparatus as defined by claim 1, wherein said means for sensing noxious emissions in said exhaust gases includes a sensor adapted to be disposed in said exhaust gases for sensing the concentration of a noxious emission and which generates an electrical signal that depends upon said concentration; and wherein said means for controlling said fogging device includes:
   a processor responsive to said electrical signal for generating a control signal; and
   a pneumatic control system responsive to said control signal for controlling said supply of water and said supply of compressed air to said fogging device.

8. Apparatus as defined by claim 1, further comprising a supply of chemical suitable for reacting with a component of said noxious emissions, and means for combining said chemical with the water supplied to said fogging device.

9. Apparatus as defined by claim 8, wherein said means for combining said chemical with said water supplied to said fogging device is responsive to said means for sensing noxious emissions in said exhaust gases.

10. Apparatus as defined by claim 1, further comprising an adjustable heat exchanger for exchanging heat from the output of said turbine to said input air, and means for adjusting the amount of heat exchange of said heat exchanger in accordance with the properties of the input air and the level of fog being generated.

11. Apparatus as defined by claim 9, further comprising an adjustable heat exchanger for exchanging heat from the output of said turbine to said input air, and means for adjusting the amount of heat exchange of said heat exchanger in accordance with the properties of the input air and the level of fog being generated.

12. An improved turbine apparatus, comprising:
    a turbine power generator, including a source of input air, and a source of fuel, a compressor which receives said input air, a combustion chamber which receives air from the output of the compressor and fuel from said source of fuel, a turbine which receives exhaust gases from said combustion chamber; and an electrical generator mechanically coupled with said turbine;
    a fogging device communicating with said air from the output of said compressor, said fogging device being adapted to receive a fogger air supply and a fogger water supply, and to generate a fog in the air received by said combustion chamber;
    means for sensing noxious emissions in said exhaust gases; and
    means for controlling said fogging device in accordance with the sensed noxious emissions.

13. Apparatus as defined by claim 12, wherein said sensing means is operative to sense the concentration of said noxious emissions, and wherein said fogging device is controlled in accordance with said concentration.

14. Apparatus as defined by claim 13, wherein said means for controlling said fogging device is operative to increase the water volume per unit time of said fog as the concentration of noxious emissions increases.

15. Apparatus as defined by claim 12, wherein said means for controlling said fogging device is operative to control both the supply of water and the supply of compressed air to said fogging device.

16. Apparatus as defined by claim 12, wherein said means for sensing the concentration of noxious emissions includes means for sensing the concentration of $NO_x$ in said exhaust gases.

17. Apparatus as defined by claim 12, wherein said means for sensing noxious emissions in said exhaust gases includes a sensor adapted to be disposed in said exhaust gases for sensing the concentration of a noxious emission and generating an electrical signal which depends upon said concentration; and wherein said means for controlling said fogging device includes:
    a processor responsive to said electrical signal for generating a control signal; and
    a pneumatic control system responsive to said control signal for controlling said supply of water and said supply of compressed air to said fogging device.

18. Apparatus as defined by claim 12, further comprising a supply of chemical suitable for reacting with a component of said noxious emissions, and means for combining said chemical with the water supplied to said fogging device.

19. Apparatus as defined by claim 18, wherein said means for combining said chemical with said water supplied to said fogging device is responsive to said means for sensing noxious emissions in said exhaust gases.

20. Apparatus as defined by claim 18, further comprising a heat exchanger for exchanging heat from the output of the turbine to the fogged air received by the combustion chamber.

* * * * *